United States Patent
Mathew et al.

[11] Patent Number: 5,931,510
[45] Date of Patent: Aug. 3, 1999

[54] HOSE END FITTING ASSEMBLY

[75] Inventors: Boney A. Mathew; Norman S. Martucci, both of Clarkston, Mich.

[73] Assignee: Teleflex Incorporated, Plymouth Meeting, Pa.

[21] Appl. No.: 08/877,679

[22] Filed: Jun. 17, 1997

[51] Int. Cl.$^6$ .................................................. F16L 55/00
[52] U.S. Cl. .................. 285/148.21; 285/259; 285/305; 285/319; 285/423
[58] Field of Search ................................... 285/319, 305, 285/148.21, 259, 423

[56] References Cited

U.S. PATENT DOCUMENTS

| | | | |
|---|---|---|---|
| Re. 35,527 | 6/1997 | Martucci | 174/138 |
| 4,664,424 | 5/1987 | Smith | 285/285 |
| 5,046,763 | 9/1991 | Martucci et al. | 285/285 |
| 5,080,404 | 1/1992 | Sauer | 285/319 X |
| 5,094,493 | 3/1992 | Sauer | 285/319 X |
| 5,211,429 | 5/1993 | Charlson et al. | 285/285 |
| 5,219,188 | 6/1993 | Abe et al. | 285/319 X |
| 5,586,792 | 12/1996 | Kalahasthy et al. | 285/305 X |
| 5,683,117 | 11/1997 | Corbett et al. | 285/305 X |
| B1 5,124,878 | 4/1996 | Martucci | 361/138 |

FOREIGN PATENT DOCUMENTS

| | | | |
|---|---|---|---|
| 0066742 | 12/1982 | European Pat. Off. | F16L 33/22 |
| 2216971 | 10/1988 | United Kingdom | F16L 33/20 |

*Primary Examiner*—Dave W. Arola
*Attorney, Agent, or Firm*—Kohn & Associates

[57] ABSTRACT

A quick connect hose coupling assembly (10) for connecting a hose to an external device is disclosed. The assembly (10) includes a female coupling assembly (12) having an inner female tubular member (16). A housing member (14) is mounted thereon. The female member (16) includes a body portion (17) and a stem (20) adapted to be inserted into the inner channel (37) of a hose (38). The stem (20) includes an axial bore (21) adapted to convey a fluid therethrough. The stem (20) further includes a plurality of circumferential barbs (22). The stem (20) can also include an additional barb having a rotation resisting structure provided thereon to resist relative rotational movement between the stem (20) and a hose (38) into which the stem (20) is disposed. In a preferred embodiment of the invention, after the stem (20) is inserted into the end of the hose (38), a collar (40) of a plastic material is directly molded onto the portion of the hose (38) which is mounted over the stem (20), over a portion of the body (17) of the female member (18), and over a portion of the female housing member (14), thereby clamping the hose (38) to the stem (20), and affixing the collar (40) to the female member (18) and to the female housing member (14). Additionally, a novel detent clip (72) is inserted in apertures (64) provided in the housing member (14) to cooperate in engaging a circumferential flange provided on a male member (66), thereby retaining the male member (66) within the channel (18) of the female member (16).

27 Claims, 5 Drawing Sheets

HOSE END FITTING ASSEMBLY

TECHNICAL FIELD

The present invention relates to an end fitting for a hose assembly. More specifically, the present invention relates to an end fitting structure adapted to be inserted into a hose for connecting the hose to an external device.

BACKGROUND OF THE INVENTION

It is common practice in the hose art to use barbed hose fittings to affix a hose fitting to a hose assembly. These end fittings are commonly attached to the hose by methods such as crimping to retain the fitting and to prevent the fitting from being pulled off of the hose assembly.

In today's increasingly more complex industrial and commercial environments, hoses and hose assemblies must be able to withstand harsh and highly demanding extremes of conditions. For example, hose assemblies are subjected to environments of extreme temperature and/or highly corrosive fluids. Chemically unreactive non-metallic fittings are particularly desirable when the hose is to be used in a corrosive environment. Furthermore, non-metallic hose fittings are generally lighter in weight and, in some instances, cheaper than conventional metallic hose fittings.

Current plastic end fitting designs require a heavy crimping force be applied about a collar around the hose and assembly to completely seal the interface between the end fitting and the hose to provide a fluid tight seal and to provide sufficient resistance to pull-off of the end fitting. In the typical environment in which a fuel hose and its associated components operate, continuous thermal-cycling can take place which has a tendency to induce a high degree of heat deflection in current plastic end fittings. The principal drawback of current end fitting designs is that the stress created by the crimp of a collar around a hose and end fitting magnifies the heat deflection effects caused by thermal-cycling. Additionally, the large crimping forces required to affix the end fitting to the hose can cause perforations or cuts to be formed in the hose which allow for the permeation of volatile fluids flowing therethrough.

A typical example of an end fitting which is inserted into a hose and affixed by crimping a collar around the hose and end fitting is shown in U.S. Pat. No. 4,664,424 to Smith. Unfortunately, the forces used to compress the hose between the end fitting and the crimp collar can be so great that they cause perforation or cutting of the hose, leading to permeation, leakage, or failure of the hose assembly at the point where the damage to the hose takes place. Frequently, this type of damage takes place where the hose is tightly pressed against barbs, ribs, or grooves disposed on the portion of the end fitting inserted within the hose. That is, the hose is pressed against edges or protrusions on the ribs or barbs when the crimp collar is compressed about the hose assembly and this locally intense pressure point can cause the above-mentioned damage to the hose. Additionally, damage to the hose can occur when the hose is allowed to rotate about the insert portion of the end fitting thereby potentially causing damage to the hose from the rubbing or cutting action of the ribs or barbs against the interior surface of the hose.

Various approaches have been described for offering increased resistance to end fitting pull-off including increased crimping force and/or the use of some form of mechanism to prevent the rotation of the hose about the insert portion of the end fitting. Such a mechanism is disclosed in European Patent Application Number 0066742 wherein a series of longitudinally disposed teeth are used to prevent axial rotation of the hose about the end fitting. A drawback to this method, however, is that the ridges or barbs can still cause perforation or damage to the hose.

British Patent Application Number 2216971 discloses a hose end fitting in which a stem portion including a plurality of barbs in which the barbs each have a progressively increasing angle to reduce the incidence of failure of the hose at the stem. U.S. Pat. No. 5,211,429 to Charlson et al. discloses a pipe fitting having at least two axially spaced annular barbs wherein each barb is provided with a staggered angle or back rake configuration. The barbs are utilized to restrict movement of a sleeve away from a pipe sought to be joined. In particular, the barbs of the sleeve compress the pipe radially inwardly and prevent its movement. The Charlson et al. patent discloses that the staggered angle or back rake configuration assists in the compression of the exterior surface of a pipe sought to be joined thereby preventing relative longitudinal movement therebetween.

A common coupling in use today includes a metal housing which receives a metal male member having a circumferential flange. The housing typically includes an O-ring for sealing the male member therein. The male member is secured within the housing by a plurality of spring loaded detents which spring open to allow insert for the insertion of the male member and flange and then springs closed to prevent withdrawal of the male member. However, this type of coupling allows for "end play" of the male member within the coupling. This "end play" can cause deterioration or displacement of the O-ring leading to leakage and failure of the seal therebetween.

Therefore, it would be advantageous to have an end fitting for a hose assembly which reduces or prevents barb-induced perforation of the hose and the resultant permeation of fluids flowing therethrough. Additionally, it would be advantageous to have an end fitting which further reduces end fitting-induced damage to a hose by preventing axial rotation of the hose about the end fitting. Additionally, it would be advantageous to have an end fitting which requires less crimp force than previous end fitting designs thereby eliminating excess stressing or prestressing of the insert portion of the end fitting and preventing damage to the hose caused by excess compression of the hose material against the ridges or barbs of the insert portion of the end fitting. Furthermore, it would be advantageous to have an end fitting which eliminates the drawbacks of the prior art end fittings discussed above.

SUMMARY OF THE INVENTION

According to the present invention, there is provided an end fitting for connecting a hose to an external device including a stem adapted to be inserted into the inner channel of a hose and having an axial bore for conveying fluid therethrough. The stem includes a plurality of circumferential barbs having a plurality of lands at the outer surface thereof. The stem can additionally include an additional barb having rotation resisting means provided therein to resist rotational movement between the stem and the hose into which the stem is disposed.

In the preferred embodiment of the invention, instead of utilizing a conventional clamp to clamp the end of the hose to the stem of the coupling device, a plastic collar can be directly molded over the portion of the hose into which the stem is inserted, over a portion of the female member, and over a portion of the housing member thereby clamping the hose to the stem with strong uniform pressure, and connecting the collar to the female member and the housing member.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1A:
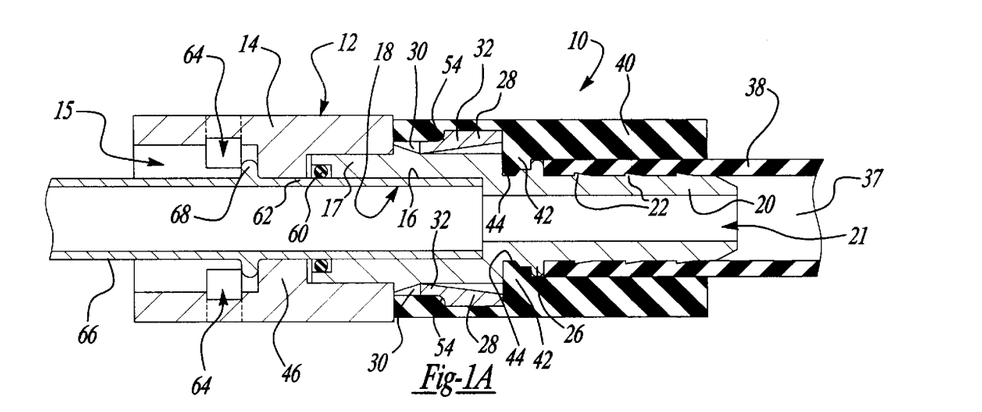
FIG. 1A is an axial sectional view of the quick connect hose coupling assembly (10)

Referring to FIG. 1A, the quick connect hose coupling assembly 10 comprises a coupling assembly, generally shown at 12, which includes a housing member 14 having an axial channel 15 and an inner tubular member 16 mounted therein. The proximal part of the tubular member 16 includes a body portion 17 having an axial channel 18 therein. At the end of the axial channel 18 there is provided an annular recess 60 in which an annular sealing member 62 is positioned in order to provide a seal between the channel 18 and a male member 66 positioned therein.

Figures 3, 4, 5A, 5B, 5C:
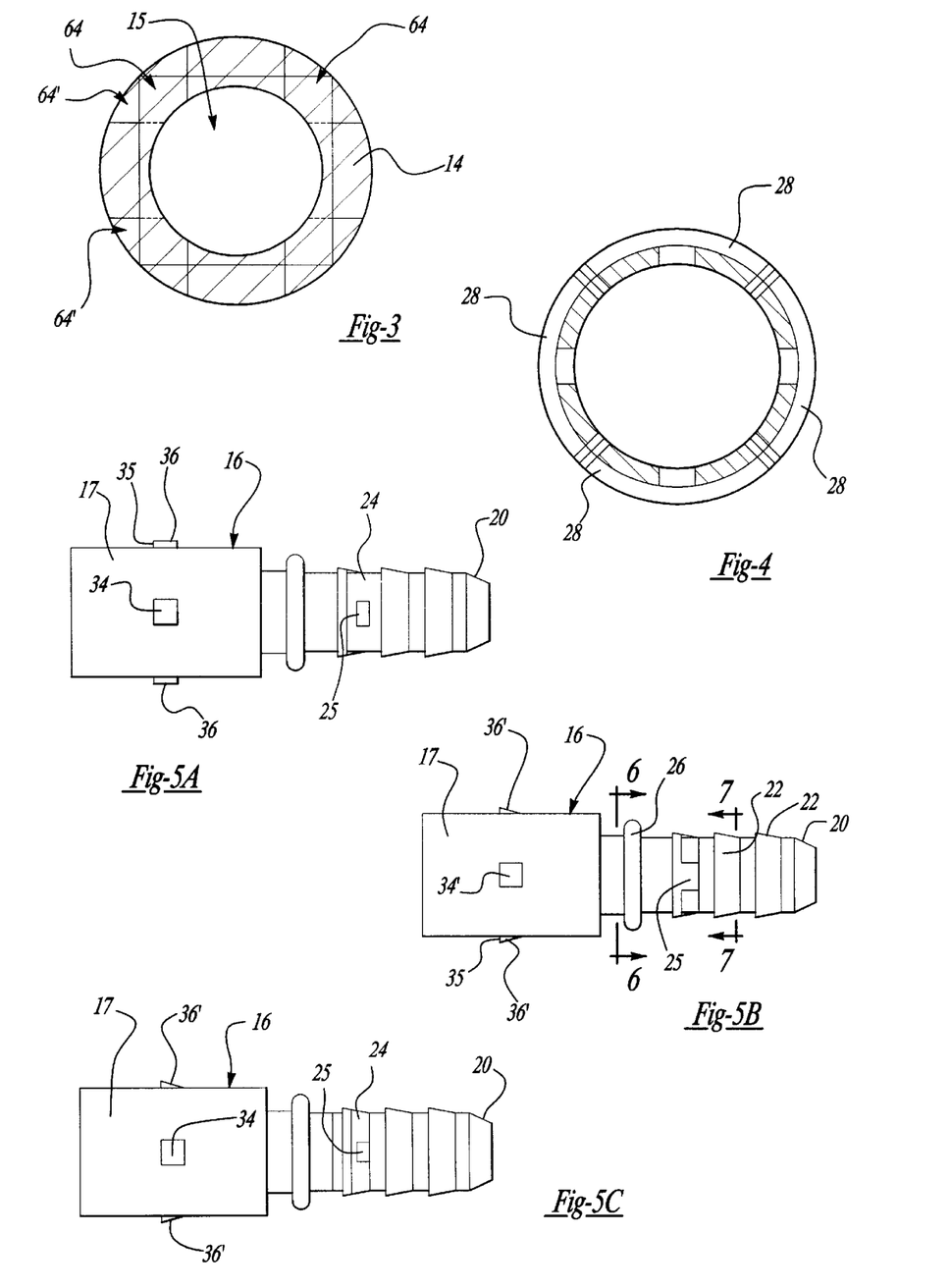
FIG. 3 is a cross-sectional view taken at the line 3—3 of FIG. 2.
FIG. 4 is cross-sectional view taken at the line 4—4 of FIG. 2.
FIG. 5A is a side elevational view of the inner female tubular member (16)
FIG. 5B is a side elevational view of a further embodiment of the inner female tubular member (16)
FIG. 5C is a side elevational view of a further embodiment of the inner female tubular member (16)

The distal portion of the female member 16 includes a stem 20 having an axial channel 21 communicating with the axial channel 18. The stem 20 is provided with a plurality of circumferential barbs 22 to prevent axial movement of the hose and also reduces material creep and cold flow, and a plurality of discontinuous barbs 24 to prevent rotation of the hose. Referring to FIG. 5B, a discontinuity 25 in the rotation preventing discontinuous barbs 24 is disposed at the edge of the barb 24. Alternatively, referring to FIG. 5A, a preferred location for the discontinuity 25 is shown. In this embodiment, the discontinuity 25 is disposed completely within the barb 24. By disposing the discontinuity 25 completely within the field of the barb 24, a potential fluid leak path may be eliminated. The tubular member 16 is also provided with an annular flange 26 to stop axial movement of the hose.

Figure 1B:
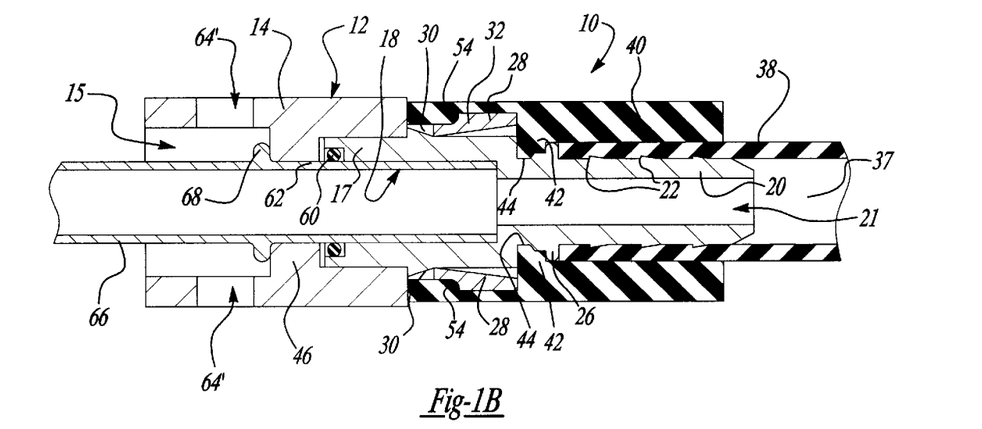
FIG. 1B is an axial sectional view of a further embodiment of the quick connect hose coupling assembly (10)

Referring to FIGS. 1A and 1B, a collar 40 formed of a plastic material can be directly molded over the portion of the end of the hose 38 into which the stem 20 is inserted, thereby clamping the hose 38 onto the stem 20 with strong uniform clamping force, thereby avoiding the danger of damaging the hose which results when conventional clamping means is utilized. The use of a collar 40 which is directly molded over the end of the hose 38 into which the stem 20 is inserted eliminates the prior art problem associated with crimped on collars which is the elongation or longitudinal growth of the crimped collar which can cause damage to the underlying hose. A portion 42 of the collar 40 flows into a recess 44 in the tubular member 16, thereby securing the collar 40 to the member 16. Another portion 54 of the collar 40 flows over the fingers 28 and engages hooks 32, thereby securing the collar 40 additionally to the housing member 12. Alternatively, conventional metal collars can be affixed in place of the molded collar 40 by methods such as crimping.

Figure 2:
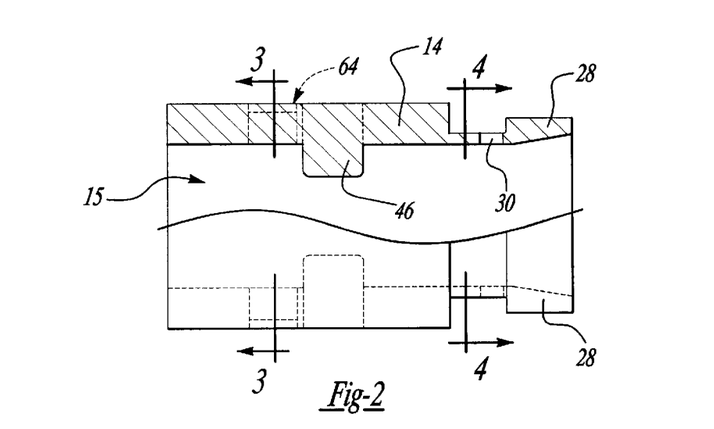
FIG. 2 is an axial sectional view of the female housing member (14)

Referring to FIGS. 2, 3, and 4, the housing member 14 is shown in greater detail. The distal end is cut axially to provide a plurality of fingers 28. Each of the fingers 28 has a detent aperture 30 to engage protuberances 34,36 provided on the outer surface of the tubular member 16, as shown in FIGS. 5–10. The fingers 28 also have outwardly directed hooks 32 to engage portions of a molded on collar 40. The detent aperture 30 can be angled to receive and retain the protuberances 34,36 therein.

The detent aperture 30 is preferably disposed at the proximal end of the outwardly directed hooks 32 as shown in FIG. 2. In this location, upon insertion of the tubular member 16 into the housing member 14, the moment arm of the fingers 28 is shorter thereby reducing the force required to spread the fingers 28 apart to allow for the insertion of the tubular member 16 therein. By reducing the force required to spread the fingers 28 apart, the fingers 28 are not deflected nor deformed and can more positively engage the protuberances 34,36 provided on the outer surface of the tubular member 16 without being damaged.

The housing member 14 is provided with an axial channel 15. In the axial channel 15 is an inwardly directed annular flange 46. The annular flange 46 has three separate functions. First, it serves as a bearing for the male member 66. Second, it provides a stop for the proximal end of the tubular member 16 and for the sealing ring 62. Third, it serves as a stop for the circumferential flange 68 of the male member 66.

The housing member 14 is also provided with apertures 64 extending through the entire thickness of the wall of the housing member 14. The apertures 64 receive a detent clip 70 utilized to retain the circumferential flange 68, and thereby retain the male member 66 within the tubular member 16. In an alternative embodiment as shown in FIG. 3, an additional set of apertures 64' can be disposed in the housing member 14 to receive a second detent clip 70. Preferably, the second set of apertures 64' are axially spaced apart from the apertures 64, offset approximately 90° from apertures 64, and are not in the same plane as the apertures 64. The use of an additional clip 70 disposed in the apertures 64' provide for a more positive fixation of the male member 66 within the tubular member 16.

Alternatively, in order to accommodate an additional clip 70 for more positively fixing the male member 66 within the tubular member 16, the apertures 64 can be elongated as shown in FIG. 1B. In this configuration, the apertures 64 can receive and accommodate two clips 70 in a tandem orientation.

Referring to FIGS. 5A–C, 6, and 7, the tubular member 16 is shown in greater detail. The tubular member 16 includes a body portion 17 and a stem 20. An annular flange 26 stops proximal axial movement of a hose which is mounted on the stem 20, as shown in FIG. 1A. An annular groove 44 engages an annular ring 42 of the collar 40 which is subsequently mounted thereover.

The annular flange 26 includes recesses 48 to prevent rotation of the collar 40 which is subsequently molded or crimped thereon. As shown is FIGS. 5A–C and 7, discontinuous barbs 24 on the stem 20 prevent rotation of the hose 38.

Figure 14:
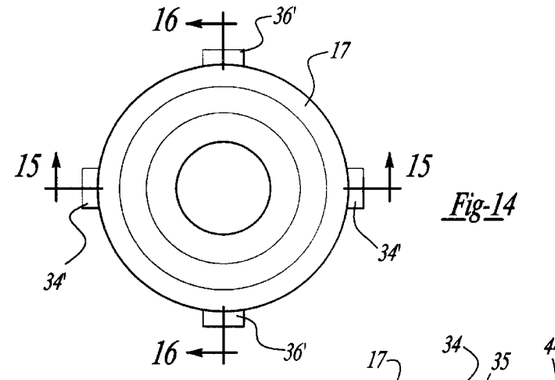
FIG. 14 is an end view of the body portion (17) of the female member (16)
Figure 15:
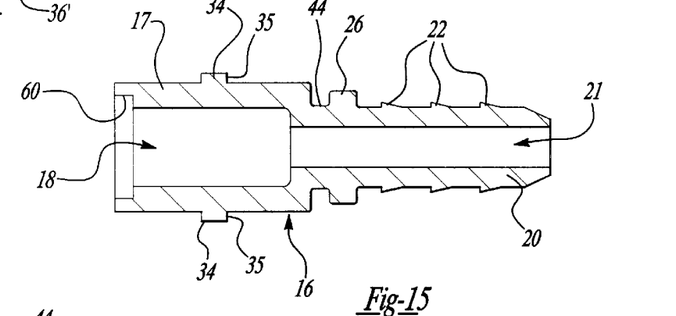
FIG. 15 is a cross-sectional view taken along line 15—15 of FIG. 14.
Figure 16:
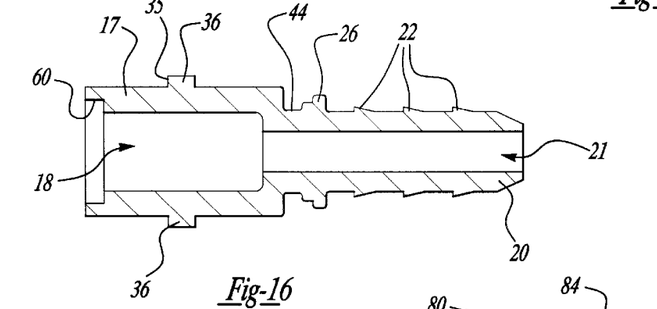
FIG. 16 is a cross-sectional view taken along line 16—16 of FIG. 14.

Referring to FIGS. 5A, 14, 15, and 16, the female member 16 is illustrated in a preferred embodiment showing the particular arrangement of the protuberances 34 and 36. FIG. 14 is an end view of the proximal end of the female member 16 for orientation purposes. In the preferred embodiment, the protrusions 34,36 have an essentially square cross-sectional shape. By utilizing the essentially square cross-sectional shape for the protrusions 34,36, both the tensile and the shear strengths of the protrusions 34,36 are increased thus increasing the pull-off resistance of the female. FIG. 16 shows the orientation of the protuberances 36 in the arrangement shown in FIG. 5A. In the view shown in FIG. 15, the protuberances 34 are arranged with their outer surfaces inclined toward the distal end of the female member 16, that is, the stem 20 end. The arrangement is such that when the housing member 14 is slidably mounted over the proximal end of the female member 16, the protuberances 34 and 36 engage the detent apertures 30 of the housing member 14, thereby preventing axial movement in both the proximal and distal directions, and effect, locking the housing member 14 in place onto the female member 16.

Figures 6, 7, 8, 9:
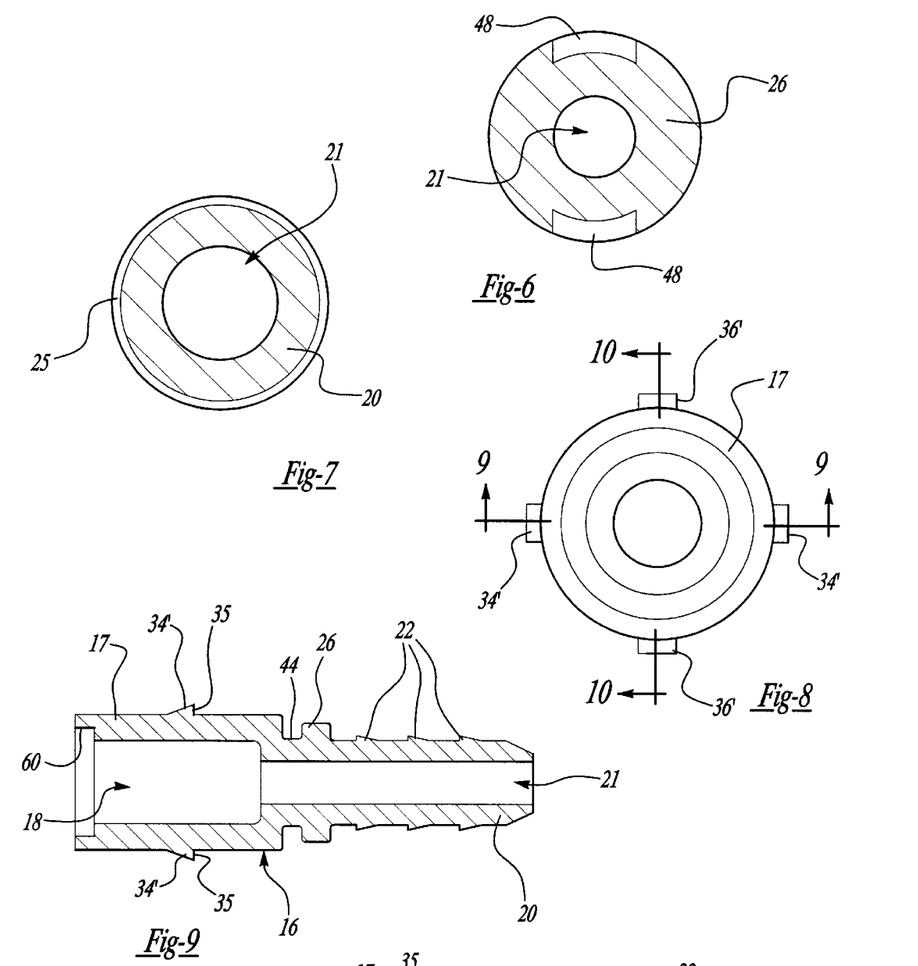
FIG. 6 is a cross-sectional view taken at the line 6—6 shown in FIG. 5A.
FIG. 7 is a cross-sectional view taken at the line 7—7 of FIG. 5A.
FIG. 8 is an end view of an alternative embodiment of body portion (17) of the female member (16)
FIG. 9 is a cross-sectional view taken at the line 9—9 of FIG. 8.
Figure 10:
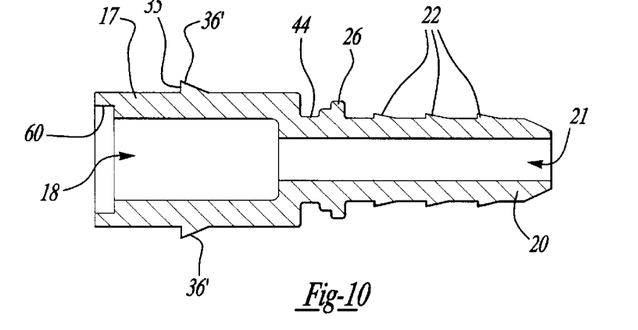
FIG. 10 is a cross-sectional view taken at the line 10—10 of FIG. 8.

Referring to FIGS. 8, 9, and 10, the female member 16 is illustrated in an alternative embodiment utilizing wedge-shaped protuberances 34',36' in several views to show the particular arrangement of the wedge-shaped protuberances 34' and 36'. FIG. 8 is an end view of the proximal end of the female member 16 for orientation purposes. FIG. 10 shows the orientation of the protuberances 36' in the arrangement shown in FIG. 5B. In these views, the protuberances 36' are arranged with their outer surfaces inclined outwardly toward the proximal end of the body portion 17 of the female member 16. In the view shown in FIG. 9, the protuberances 34' are arranged with their outer surfaces inclined toward the distal end of the female member 16, that is, the stem 20 end.

The arrangement is such that when the housing member 14 is slidably mounted over the proximal end of the female member 16, the protuberances 34' and 36' engage the detent apertures 30 of the housing member 14, thereby preventing axial movement in both the proximal and distal directions, and in effect, locking the housing member 14 in place onto the female member 16.

Alternatively, the protuberances 34' and 36' can all be oriented with their outer surfaces inclined toward the distal end of the female member 16, that is, the stem 20 end. In this orientation, all of the protuberances 34',36' provide pull-off resistance or resistance to axial movement in the distal direction.

The protuberances 34,34',36,36' each have a detent surface 35 which is the surface which engages the detent apertures 30 of the housing member 14. In general, the detent surface 35 of protuberances 36,36' are disposed at an approximately right angle (90°) with respect to the distal end of the female member 16. To increase pull-off resistance, the detent surface 35 of each protuberance 34,34', 36, 36' can be inclined distally. Preferably, the angle of inclination will be at least 1° greater with respect to the surface of the female member 16. By altering the angle or rake of the protuberances 34,34',36,36', when an axial force is applied in the distal direction along the female member 16, the distally inclined detent 35 will cause the fingers 28 to be pulled inwardly thus providing increased resistance to the separation or pulled-off of the female member 16. That is, when the protuberances are all oriented in the pull-off resistance directions, i.e., the direction of protuberances 34,34',36,36' the same as that of protuberance 34,34', the detent surface can be inclined as shown and described above for protuberance 34,34'.

Figure 11A:
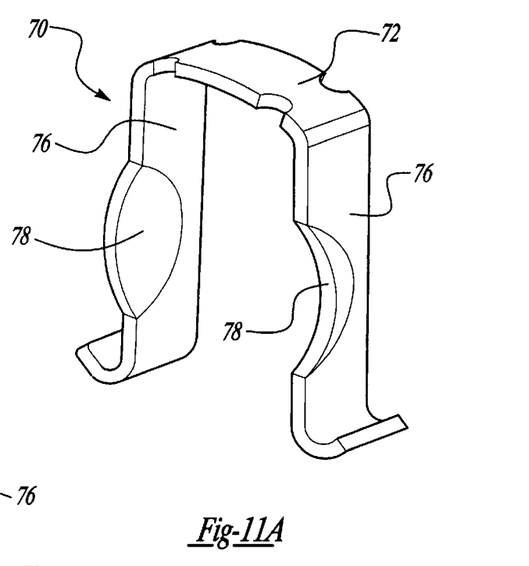
FIG. 11A is a perspective view of a generally U-shaped detent clip (70) according to the present invention.
Figure 11B:
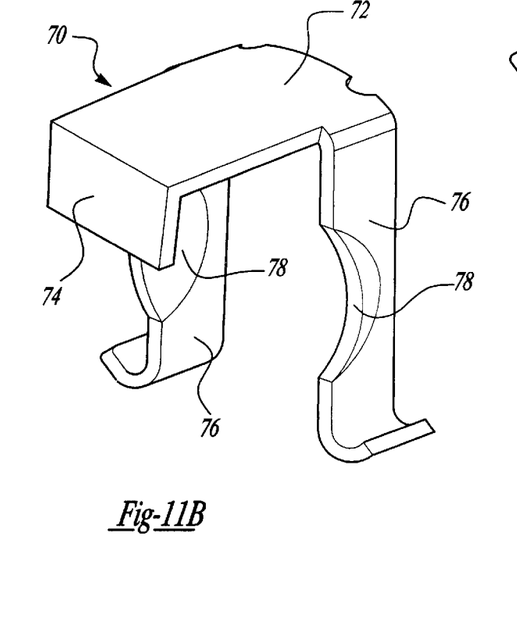
FIG. 11B is a perspective view of an alternative detent clip (70) according to the present invention.

Referring to FIGS. 11A and 11B, a generally U-shaped detent clip 70 is shown having a transverse portion 72 and a pair of legs 76. Each leg can be additionally provided with an arcuate outwardly flared edge 78. The flared edges 78 enables the male member 66 to be inserted into the female member 16 and locked therein after the clip 70 is in place in the apertures 64 of the housing member 14. FIG. 11B illustrates an optional downwardly directed flange 74.

As the male member 66 is being inserted, the circumferential flange 68 of the male member 66 engages the flared edges 78 of the legs 76 of the detent clip 70, thereby spreading the legs 76 and enabling the flange 68 to pass therethrough, and then be retained by the straight portions of the legs 76.

The optional downwardly directed flange 74 provides an additional lock or pull-out prevention mechanism for male member 66. When the clip 70 is inserted into the housing member 14, the transverse portion 72 of the detent clip 70 extends longitudinally along the housing member 14. The downwardly directed flange 74 then becomes positioned either directly adjacent to or in contact with the male member 66. In the event that the male member is axially displaced, pulled out, or becomes otherwise disengaged from the coupling assembly 10, the downwardly directed flange 74 engages the circumferential flange 68 on the male member 66 and prevents further axial movement of the male member 66. Because the length of the axial channel 15 of the housing 14 is shorter than the length of portion of the male member 66 inserted therein, if the male member 66 is displaced axially from its fixed position within the housing 14 and the downwardly directed flange 74 engages the circumferential flange 68, the seal between the male member 66 and the sealing means 62 is maintained providing a further safeguard against leakage and/or failure of the assembly 10.

Figure 12:
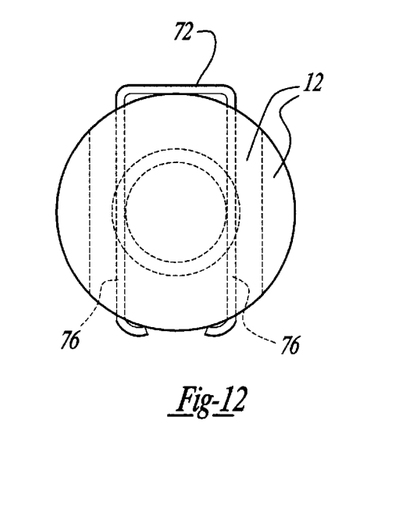
FIG. 12 is an end view of the quick connect hose coupling assembly (10) shown in FIG. 1, showing the detent clip (70) in place in the housing member (14)
Figure 13:
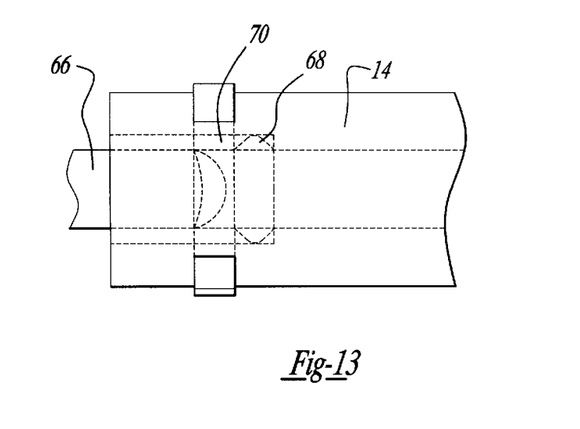
FIG. 13 is a fragmentary axial sectional view of a portion of a hose coupling assembly (10) shown in FIG. 1, and showing the detent clip (70) in place and retaining the circumferential flange (68) of the male member (66) in place.

Referring to FIGS. 12 and 13, an end portion of the housing member 14 is shown in FIG. 12, illustrating the position of the clip 70 in the apertures 64. FIG. 13 is a fragmentary side elevational view, partly in section, showing the positioning of the clip 70 and the male member 66.

In assembling the quick connect hose coupling assembly (10) of the present invention, the annular sealing ring 62, such as an O-ring, a lip seal, or a quad ring is first placed in the annular recess 60 at the inner edge of the channel 18. The housing member 14 is then placed over the proximal end of the female member body portion 17 of the female member 16. The housing member 14 is then moved axially until the shaped protuberances 34,34' and 36,36' engage the apertures 30 of the fingers 28. The housing member 14 is thereby locked in place over the female member 16. The inwardly directed annular flange 46 of the housing member 14 secures the sealing ring 62 in place.

In one embodiment of the present invention, the stem 20 can then be inserted into the end of a hose 38 and various clamping means utilized to clamp the end of the hose 38 to the stem 20. The hose 38 can be any suitable fluid carrying hose which can be affixed to the assembly 10. The hose 38 can be constructed of any suitable materials such as fluoropolymer composite hose, for example, that disclosed in U.S. Pat. No. 5,124,878, Reexamination No. B1 5,124,878.

In a preferred embodiment of the present invention, the collar 40 constructed of a plastic material is directly molded over the end of the hose 38 and the stem 20, thereby clamping the hose 38 to the stem 20 with a strong uniform clamping force. A portion of the collar 40 in the form of an annular ring 42 is molded into the recess 44 provided in the female member 16. Additionally, a portion of the collar is molded over the fingers 28 of the housing member 14, with a portion engaging the hooks 32 of the fingers 28. As a result, a strong coupling assembly is formed.

The female member 16 and the housing member 14 can be formed of any of a number of suitable plastic materials such as polypropylene, polyurethanes, aliphatic polyketones, fluoropolymers such as PFA, FFP, ETFE, PVDF, and polyamides such as polyamide 6; polyamide 6,6; polyamide 12; or polyamide alloys or blends.

The material comprising the female member 16 and the housing member 14 can also include reinforcing materials which are mixed in or filled into the plastic material. The reinforcing materials can include materials such as glass fibers, minerals, carbon fiber or combinations thereof.

In addition, the female member 16 and the housing member 14 can also be made static dissipative by adding materials such as carbon black powder, carbon fiber, metallic powders, metallic fibers, or combinations thereof to the materials which are used to form the female member 16 and the housing member 14.

The collar 40 can be formed of any suitable plastic molding materials, such as those listed above. It is preferred to utilize a molding material for the collar 40 of the same material, or a material compatible with the material which is utilized for the outer coating of the hose 38. As a result, when the collar 40 is molded over the end of the hose, the molten material of the collar 40 coalesces to a degree with the surface of the hose 38.

A preferred hose for utilization in the preferred embodiment of the present is that shown and described in U.S. Pat. No. 5,170,011, RE35527, issued Jun. 10, 1997, to Martucci, the disclosure of which is incorporated herein by reference.

Figure 17:
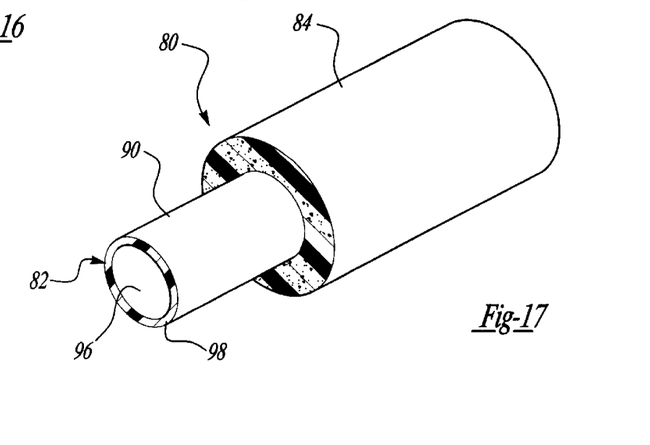
FIG. 17 is a perspective view partially broken away and in cross-section of a preferred embodiment of a hose to be utilized together with the preferred embodiment of the hose coupling assembly of the present invention.

Referring to FIG. 17, the hose as disclosed in the patent referred to above comprises an assembly 80 which includes a tubular inner liner 82, an outer layer 84 disposed about the inner liner 82, an integral conductive means 86 coextensive with the length of the inner liner 82. The conductive means can comprise an inner layer 96 of carbon black positioned adjacent an inner surface 98 of the inner liner 82. The tubular inner liner 82 comprises a polymeric fluorocarbon material resistant to both chemical and heat degradation, thus allowing a variety of fluids, particularly automotive fuels and fuel additives, e.g., detergents, alcohols, etc., to pass through the inner liner 82 without corroding or degrading the inner liner 82. the inner liner 82 is preferably extruded using well-known melt or paste extrusion techniques and has a wall thickness of between 0.001 and 0.120 inch. Although the inner liner 82 can be made of any number of polymeric fluorocarbon materials, it is ideally made from a polymer of the following: polytetrafluoroethylene (PTFE), the homopolymer of tetrafluoroethylene sold under the trademark TEFLON by DuPont, perfluoronated ethylene-propylene (FEP), the copolymer of tetrafluoroethliene and hexafluoropropylene sold under the trademark TEFLON FEP and various other fluoropolymers.

The outer layer 84 is disposed about the inner liner 82. The outer layer 84 can comprise a polyamide material for increasing the strength of the hose assembly 80. More specifically, the outer layer 84 allows the inner liner 82 to be bent without kinking. That is, the outer layer 84 provides strength to the inner liner 82 upon bending. This is commonly referred to as hoop strength. Thus, by disposing the outer layer 84 about the inner liner 82, the hoop strength of the inner liner 82 is increased. Further, the outer layer 84 adds to the working pressure of the hose.

Although the outer layer 84 can be made of any number of polyamide materials, preferably it is made from a polyamide material selected from the following: polyamide 6; polyamide 6,6; polyamide 11; polyamide 12; and/or polyamide alloys or blends. Any other suitable polyamides can also be used.

Preferably, the outer layer 84 is comprised of an expanded polyamide material, as shown in FIG. 17. The use of an expanded material provides the hose with a great deal of strength, while reducing both the cost and the weight of the hose. In order to prevent relative movement between the inner liner 82 and the outer liner, the outer surface 90 of the inner liner 82 can be etched by chemical methods such as by acid treatment, mechanical methods, or by corona or plasma discharge treatment, prior to applying the outer layer 84 thereover. During extrusion of the outer layer 84, the outer layer 84 matingly engages with the inner liner 82 thereby resulting in a mechanical bond, chemical bond, or both therebetween, and preventing both rotational and longitudinal movement between the layers.

When a hose 80 having an outer polyamide layer 84, as shown in FIG. 17 and described herein, is utilized together with the hose coupling assembly 10 according to the invention, it is preferred that the collar 14 be formed of the same polyamide polymer as the polyamide outer layer 84, or at least a polymer compatible therewith, so that the surface of the collar 14 can coalesce with the surface of the outer layer 84.

The clip 70 is preferably formed of a metal such as steel in order to render it fire resistant. The fire resistant property is important as, in the event of a fire, the coupling 10 and hose 38 may be totally consumed and the clip 70 affixed to the male member 66 would be the only indicator that the coupled assembly 10 was properly joined together.

The quick connect hose coupling assembly 10 of the present invention has many advantages over coupling assemblies disclosed in the prior art. First, because of the interlocking features, the housing member 14 and the female member 16 lock together into a strong permanent structure. The use of a molded on collar for securing the end of a hose 38 to the stem 20 provides a strong clamping force which is uniform and will not damage the hose. Additionally the use of the present U-shaped detent clip 70 cooperating with the apertures 64,64' of the housing member 14 and engaging the circumferential flange 68 of the male member 66 provide a strong positive retention means for the male member 64.

The provision of a stem 20 having both circumferential barbs 22 and discontinuous barbs 24 to prevent both axial and rotational movement of the hose on the stem provides a very secure means of clamping the hose. The stem 20 can be configured according to the design disclosed in copending application, U.S. Ser. No. 08/877,116, filed the same day as the present application and is herein incorporated by reference.

The coupling assembly 10 of the present invention can be made by injection molding techniques which are well known to those skilled in the art.

The invention has been described in an illustrative manner, and it is to be understood the terminology used is intended to be in the nature of description rather than of limitation.

Obviously, many modifications and variations of the present invention are possible in light of the above teachings. Therefore, it is to be understood that within the scope of the appended claims, reference numerals are merely for convenience and are not to be in any way limiting, the invention may be practiced otherwise than as specifically described.

What is claimed is:

1. A quick connect hose coupling assembly (10), said assembly (10) comprising:

a tubular member (16) having a proximal end and a distal end, a body portion (17) disposed at said proximal end having an axial channel (18) extending therethrough, and having at its distal end, a stem (20) having an axial channel (21) communicating with said axial channel (18);

a housing (14) having an axial channel (15) and being disposed on said body portion (17) of said tubular member (16), and affixation means for affixing said housing (14) to said body portion (17);

said proximal end of the axial channel (18) of said body portion (17) having an internal annular recess (60) provided therein and sealing means (62) disposed within said internal annular recess (60), said housing (14) having an internal annular flange (46) engaging and retaining said sealing means (62) within said internal annular recess (60); and said axial tubular channel (18) of said body portion (17) of said tubular member (16) adapted to receive and retain a male member (66) within the opening of said annular internal flange (46) and including securing means for securing the tubular male member (66) within the axial channel (18) of said body portion (17).

2. A coupling assembly (10) according to claim 1, wherein a distal end of said affixation means includes a plurality of fingers (28) extending therefrom, each of said fingers (28) having a detent aperture (30) provided therein, said tubular member (16) having a plurality of protuberances (34, 34', 36, 36') on said body (17) thereof adapted to engage said detent apertures (30) of said fingers (28) and thereby locking said housing (14) and said tubular member (16) together.

3. A coupling assembly (10) according to claim 2, wherein a plurality of said protuberance are substantially square in cross-section.

4. A coupling assembly (10) according to claim 2, wherein a plurality of said protuberances (34) are wedge-shaped and are arranged with their outer inclined surfaces directed toward the distal end of the tubular member (16), and wherein a plurality of said protuberances (36) are wedge-shaped and are arranged with their outer surfaces inclined toward the proximal end of said tubular member (16).

5. A coupling assembly (10) according to claim 1, wherein said sealing means (62) is an O-ring.

6. A coupling assembly (10) according to claim 1, wherein said sealing means (62) is an annular sealing ring.

7. A coupling assembly (10) according to claim 1, wherein said stem (20) includes a plurality of circumferential barbs (22).

8. A coupling assembly (10) according to claim 7, wherein said stem (20) includes at least one discontinuous barbs (24) to prevent rotation of a hose mounted on said stem (20).

9. A coupling assembly (10) according to claim 1, wherein said securing means for securing the tubular male member within said axial channel (18) of the body portion (17) of said tubular member (16) comprises a circumferential flange (68) disposed on the male member (66) for engaging said annular flange (46) of said housing (14), a plurality of apertures (64) disposed in said housing (14), and a generally U-shaped detent clip (70) having legs (76) disposed in said apertures (64) and engaging and retaining said circumferential flange (68).

10. A coupling assembly (10) according to claim 1, wherein said assembly (10) is electrically conductive.

11. A coupling assembly (10) according to claim 2, wherein protuberances (34,34',36,36') include a detent surface (35) inclined distally.

12. A quick connect hose coupling assembly (10), in combination with a hose (38) affixed thereto, said assembly (10) comprising:

a tubular member (16) including a proximal end and distal end, a body portion (17) having an axial channel (18) disposed at said proximal end thereof, and, having at its distal end, a stem (20) having an axial channel (21) communicating with said axial channel (18);

a housing (14) having an axial channel (15) and being mounted on the body portion (17) of said tubular member (16), and fixation means for affixing said housing (14) to said body portion (17);

said proximal end of said channel (18) of said body portion (17) having an internal annular recess (60) provided therein and sealing means (62) disposed within said internal annular recess (60), said housing (14) having an internal annular flange (40) engaging and retaining said sealing means (62) within said internal annular recess (60);

a portion of the end of a hose (38) being mounted on the stem (20) of said tubular member (16), and a collar (40) formed of a plastic material directly molded over the portion of said hose (38) mounted on said stem (20) and over a portion of said tubular member (16) thereby firmly clamping the end of said hose (38) to said stem (20), and affixing said collar (40) to said tubular member (16); and said axial channel (18) of said body portion (17) of said tubular member (16) adapted to receive and retain a male member (66) within the opening of said annular internal flange (46), and securing means for securing the tubular male member (66) within the axial channel (18) of said body portion (17).

13. A coupling assembly (10) according to claim 12, wherein said affixation means includes a plurality of fingers (28) extending from the end thereof, each of said fingers (28) having a detent aperture (30) provided therein, said tubular member (16) having a plurality of protuberances (34, 34', 36, 36') on said body (17) thereof adapted to engage the detent apertures (30) of said fingers (28) and thereby to lock said housing (14) and said female member (16) together.

14. A coupling assembly (10) according to claim 13, wherein protuberances (34,34,36,36') include a detent surface (35) inclined distally.

15. A coupling assembly (10) according to claim 13, wherein said plurality of protuberance are substantially square in cross-section.

16. A coupling assembly (10) according to claim 13, wherein said plurality of said protuberances (34') are wedge-shaped and are arranged with their outer inclined surfaces directed toward said distal end of said female member (16), and wherein a plurality of said protuberances (36') are wedge-shaped and are arranged with their outer surfaces inclined toward the proximal end of said female member (16).

17. A coupling assembly (10) according to claim 12, wherein said sealing means (62) is an O-ring.

18. A coupling assembly (10) according to claim 12, wherein said sealing means (62) is an annular sealing ring.

19. A coupling assembly (10) according to claim 12, wherein said stem (20) includes a plurality of circumferential barbs (22).

20. A coupling assembly (10) according to claim 12, wherein said stem (20) includes at least one discontinuous barbs (24) to prevent rotation of a hose mounted on said stem (20).

21. A coupling assembly (10) according to claim 12, wherein said securing means for securing said tubular male member within said axial channel (18) of the body portion (17) of said female member (16) comprises a circumferential flange (68) provided on said male member (66) engaging the annular flange (46) of said housing member (14), apertures (64) provided in said housing member (14), and a generally U-shaped detent clip (70) having legs (76) disposed in said apertures (64) and engaging and retaining the circumferential flange (68).

22. A coupling assembly (10) according to claim 21, wherein each of said legs (76) includes an arcuate outwardly flared edge to permit said flange (68) of said male member to spread said legs (76) to permit said flange (68) to pass therebetween.

23. A coupling assembly (10) according to claim 12, wherein said hose (80) comprises an inner liner (82) comprised of a fluoropolymer, an outer layer (84) comprised of a polyamide polymer, and wherein said collar (40) is comprised of a polyamide polymer.

24. A coupling assembly (10) according to claim 23, wherein said hose (80) includes an electrically conductive layer (96).

25. A coupling assembly (10) according to claim 23, wherein said inner liner (82) is comprised of polytetrafluoroethylene, and said outer layer (84) is comprised of a polyamide.

26. A coupling assembly (10) according to claim 25, wherein said outer layer (84) is comprised of expanded polyamide.

27. A coupling assembly (10) according to claim 12, wherein said assembly (10) is electrically conductive.

* * * * *